(12) United States Patent  
Burrell (10) Patent No.: US 7,290,500 B2
(45) Date of Patent: Nov. 6, 2007

(54) BIRD PERCH HOLDER (76) Inventor: Robert M. Burrell, 1751 Gulf Blvd., Belleair Beach, FL (US) 33786

( * ) Notice: Subject to any disclaimer, the term of this patent is extended or adjusted under 35 U.S.C. 154(b) by 297 days.

(21) Appl. No.: 11/063,164

(22) Filed: Feb. 23, 2005

(65) Prior Publication Data

US 2006/0185613 A1    Aug. 24, 2006

(51) Int. Cl.
    *A01K 31/12*    (2006.01)
(52) U.S. Cl. .................................................. 119/468
(58) Field of Classification Search ........ 119/465–468; D30/119
    See application file for complete search history.

(56) References Cited

U.S. PATENT DOCUMENTS

| 276,392 | A | * | 4/1883 | Gregory ..................... 119/468 |
| 385,650 | A | | 7/1888 | Wemple |
| 1,629,717 | A | * | 5/1927 | Leon .......................... 119/467 |
| 3,740,085 | A | | 6/1973 | Evans |
| 3,876,318 | A | | 4/1975 | Crispell |
| 5,018,480 | A | | 5/1991 | Goldman et al. |
| 5,228,411 | A | | 7/1993 | O'Rourke |
| 5,275,126 | A | | 1/1994 | Peterson |
| 5,315,957 | A | | 5/1994 | Garay |
| 5,474,025 | A | * | 12/1995 | Lee ............................ 119/464 |
| 5,487,360 | A | | 1/1996 | Yau |
| 5,511,512 | A | | 4/1996 | Pintavalli |
| 5,713,305 | A | | 2/1998 | Hollaway |
| 5,887,542 | A | | 3/1999 | Sladowski |
| 6,374,772 | B1 | | 4/2002 | Brandt |

* cited by examiner

Primary Examiner—Kimberly S. Smith
(74) Attorney, Agent, or Firm—J. David Haynes, Esq.

(57) ABSTRACT

An apparatus for mounting a bird perch to a bird cage wherein first and second sides of a mounting means clamps to the cage and holds a perch holding means onto which a perch is attached and which enables the user to compression clamp a ball joint component at a predetermined angle to position the bird perch.

10 Claims, 11 Drawing Sheets

BIRD PERCH HOLDER

BACKGROUND OF THE INVENTION

1. Field of the Invention

The present invention relates to an apparatus for securing a bird perch to the side of a structure as found in bird enclosures such as bird cages or similar structures. In particular, the invention is directed to a holder for a perch in which various sizes or diameter perches may be interchangeably used with the holder or fastener apparatus. The perch may be changed or replaced in the apparatus at will. The invention relates to holders for perches of different diameters and lengths as may be desired as well as varying the angle the perch has relative to the ground.

2. Description of the Related Art

Owners of pet birds, such as parrots, should ideally provide the bird with one or more perches of varying diameter and texture to prevent the development of foot abnormalities. Although perches may be fabricated from nontoxic natural and artificial materials, natural tree branches make the best perches because, besides foot health and exercise, they also provide a source for chewing. Parrots enjoy peeling the bark and chewing the wood of safe woods such as birch, willow, pine, apple, crab apple, dogwood, and manzanita. Eventually, the bird will destroy the perch and a new perch is required. Despite numerous advantages, natural tree branch perches are difficult to attach in a secure manner within an enclosure or cage.

Perching birds better utilize surfaces which are more horizontal on which to stand, walk and climb. A tree placed vertically for use for a bird has a trunk and major branches which are more vertical than horizontal. Perching birds better utilize surfaces which are more horizontal on which to stand, walk and climb. A tree placed vertically for use for a bird has a trunk and major branches which are more vertical than horizontal. A tree placed in a conventional position with the trunk being vertical and having horizontal branches of sufficient size to satisfy the needs of a perching bird is usually too large to fit inside a bird enclosure.

Because pet birds are of different sizes, different size perches are needed. There is a need for a bird perch holder which securely holds natural branch perches, as well as other perches, within the enclosure or cage and allows easy and convenient changing of the perch as required.

Conventional apparatuses for placement of perches generally attach to the cage and provide for horizontal placement of a perch substantially vertical to the side of a bird cage. Typical perches have a plurality of diameter dimensions to provide a bird with means to exercise its leg muscles with elongated perch members being wood of having diameters up to 2 inches or more. Wood perches are preferable to provide domestic bird species with chewing and clawing opportunities. Conventionally, a perch must be of sufficient size to be wedged tightly between two walls of the enclosure which fails to provide an apparatus for causing the perch to be mounted at a desired angle while accommodating various diameters of perches.

There is a need for an apparatus for securing a bird perch of different diameters at various angles for use by a bird.

Brandt (U.S. Pat. No. 6,374,772B1) discloses a bird perch holder consisting of a means for securing such holder to a bird enclosure. The holder has a longitudinal hole therein that accommodates one or more hollow inserts that serve to decrease the diameter of the hole to allow using perches of various diameters secured perpendicular to the side of the bird enclosure.

Johnakin (U.S. Pat. No. 5,588,397) discloses a bird perch apparatus wherein an elongated perch rod has a disk attached to one end and has a threaded stabilizing rod extending there through which is forcibly mated to the side of a cage by a wing nut and disk which are external to the cage for engaging the threaded rod.

Yau (U.S. Pat. No. 5,487,360) discloses a perching rod which has ends with a cruciform slot dimensioned to mate with a rod of the bird cage and a nut for mating with the end of such rod to forcibly engage the rod of the opposite of a bird cage.

SUMMARY OF THE INVENTION

For the foregoing reasons, a principal object of the present invention is to provide an apparatus that may be attached to a surface and provide an adjustable perch holding means that may be adjusted at any desired angle.

Other objects of the present invention are a method and apparatus comprising unique hardware for mounting a perch in a cage.

Briefly described, the preferred embodiment of the present invention provide a perch holding or securing device which may be attached to the side of a cage or similar surface wherein the device is adapted for securing different size perches thereto at various angles.

The foregoing objectives of the present invention are attained by a perch holding apparatus which comprises a means for selective engagement with a side of a cage or similar surface and a tightening mechanism for forceful engagement of a holder for a perch of a desired diameter and size, whereby the perch is selectively placed in a predetermined posture to provide placement of a perch for optimum effective use by its beneficiary, a bird.

Other objects, features and advantages of the present invention will become apparent upon reading and understanding this specification, taken in conjunction with the accompanying drawings.

LIST OF REFERENCE NUMERALS UTILIZED IN THE DRAWINGS

Present invention
Mounting means
Fist side of mounting means
Second side of mounting means
First mounting bolt
Second mounting bolt
Cage wire
Perch holding means
Handle
Adjustment bolt (this is the one for tightening)
Male threads of adjustment bolt
Exposed end
Spherical end
Ball
Linear member of ball
Ball joint component
Perch securing means
Spherical collar
Outwardly extending end of second side of mounting means 8
Planar surface of second side 8
Planar side of first end 6
Linear bore through second side 8
Diameter of ball
Linear bore through first side 6
Female threads of second end
Diameter of linear bore 40
First end of perch holding means 14
Second end of perch holding means 14
Threaded portion of first end of perch holding means 14
Male threads about periphery of linear member 26
Female threads at second end of perch holding means 14
Linear bore through second end 52 of perch holding means14
Cylindrical sleeve or cup
Interior chamber of perch holding means 14
Linear circular bore along cylindrical axis of perch securing means 30
Linear axis of perch securing means 30
Wood screw
Countersunk portion of linear bore of perch securing means 30
Perch
First end of perch securing means 30
Second end of perch securing means 30
Position of perch
Position of perch
Position of perch
First needle point alignment pin
Second needle point alignment pin
Second end of perch securing means 30.
Collar on ball joint
First flat portion of collar
Second flat portion of collar
First bird perch holder
Second bird perch holder
First end of perch 74
Second end of perch 74

DETAILED DESCRIPTION OF THE INVENTION

Figure 1:
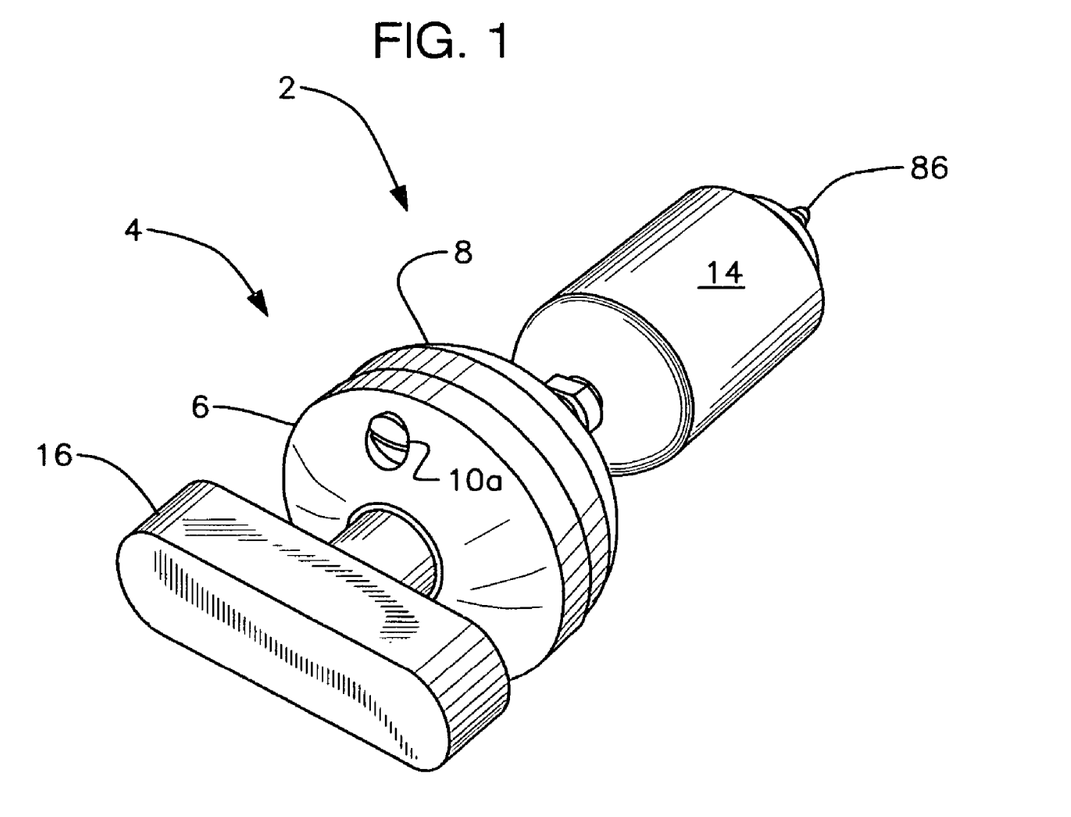
FIG. 1 is a perspective view of a bird perch holder of the present invention.
Figure 2:
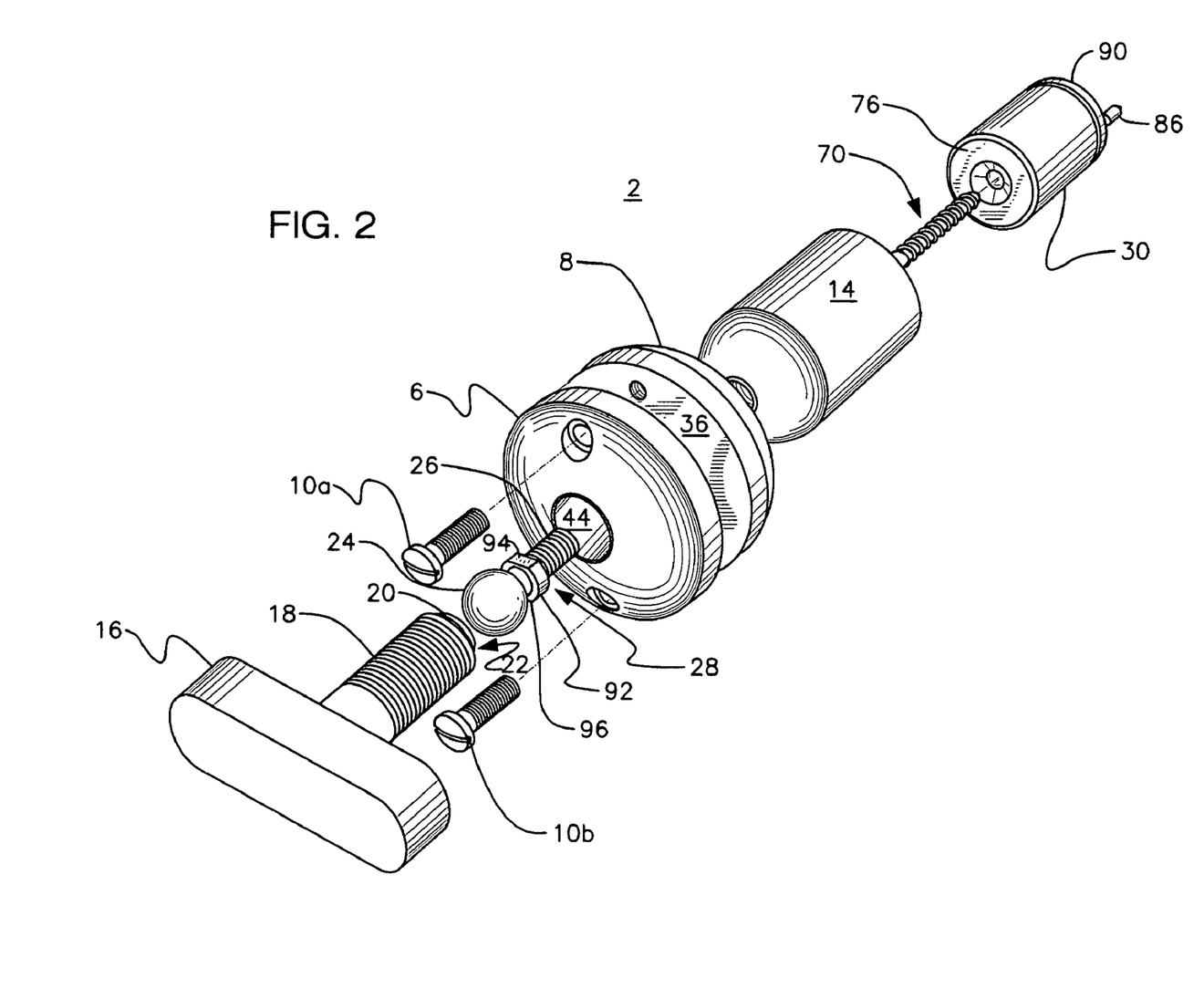
FIG. 2 is an exploded view of the present invention as shown in FIG. 1.
Figure 3:
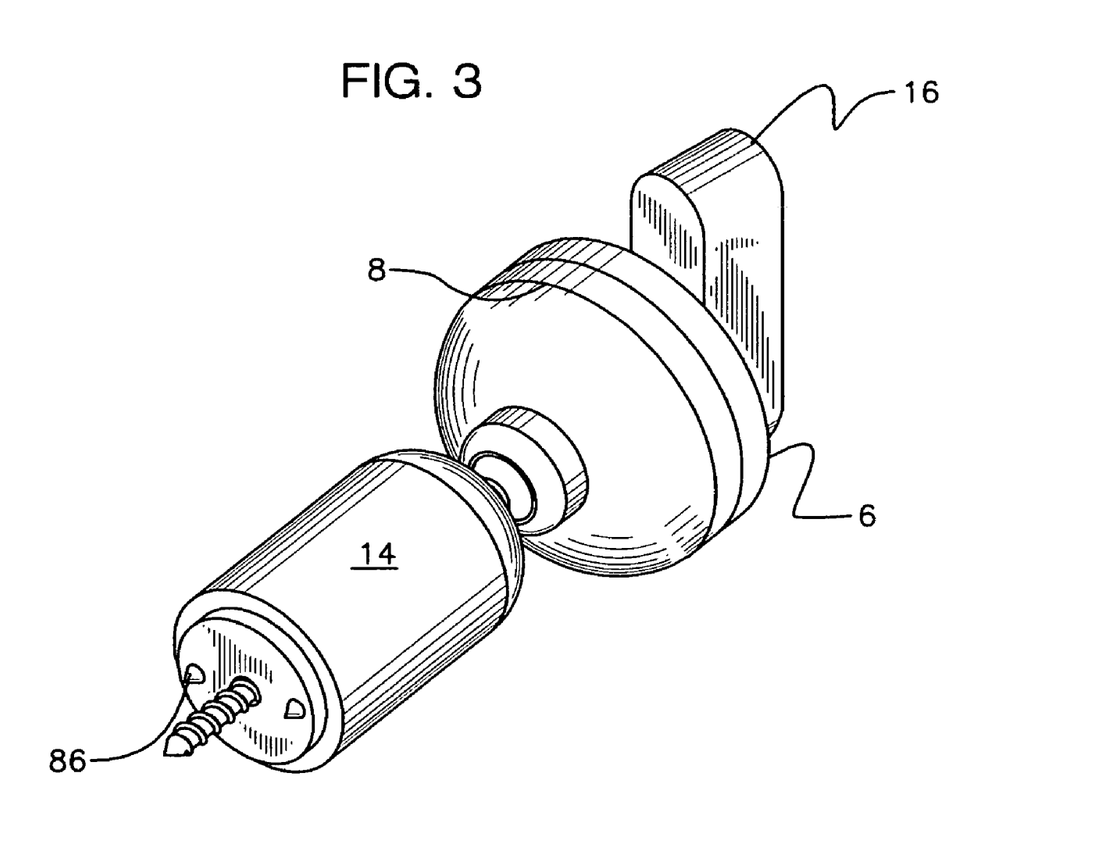
FIG. 3 is further perspective view of a bird perch holder of the present invention.
Figure 4:
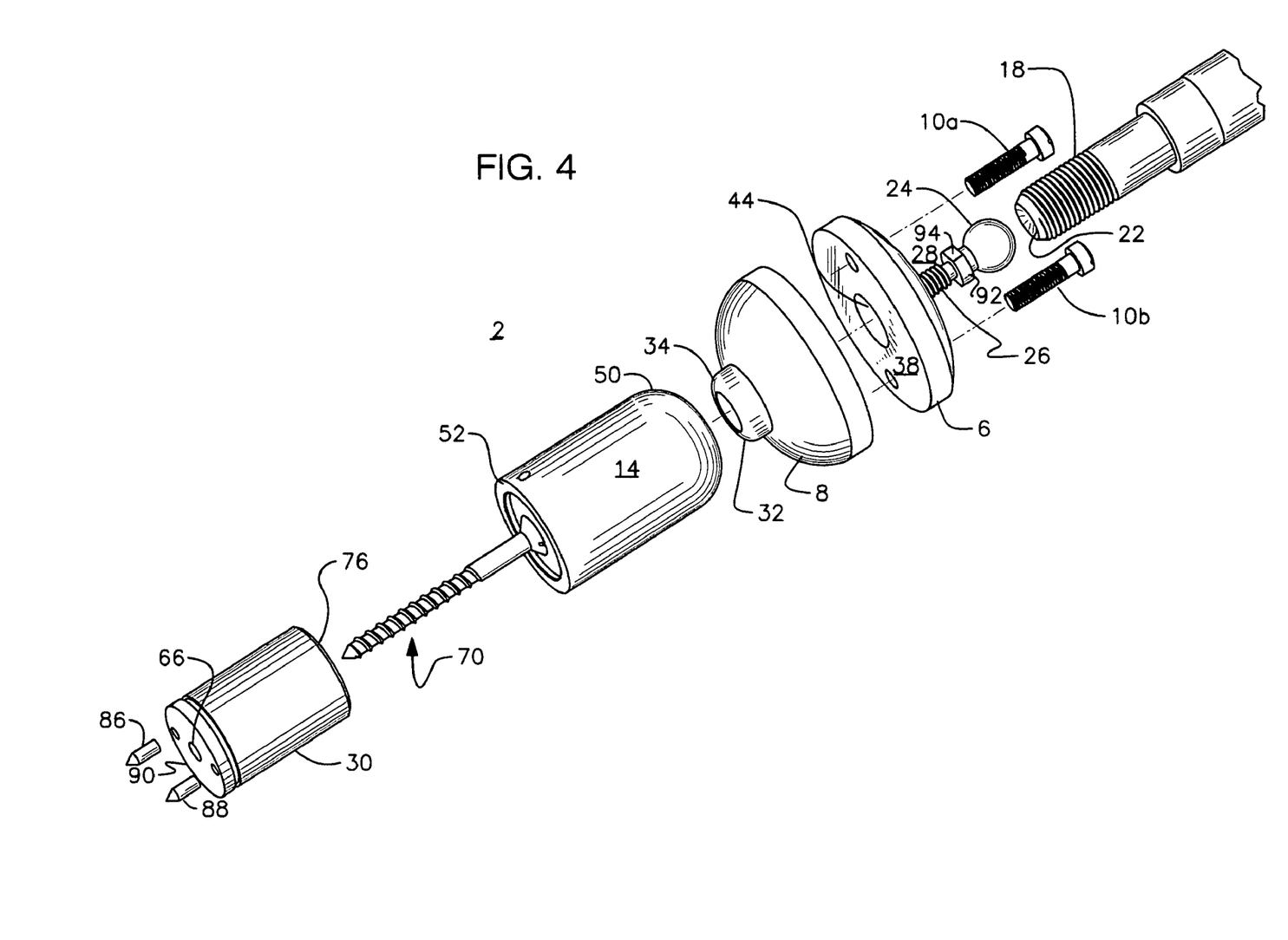
FIG. 4 is an exploded view of the present invention as shown in FIG. 3.
Figure 5:
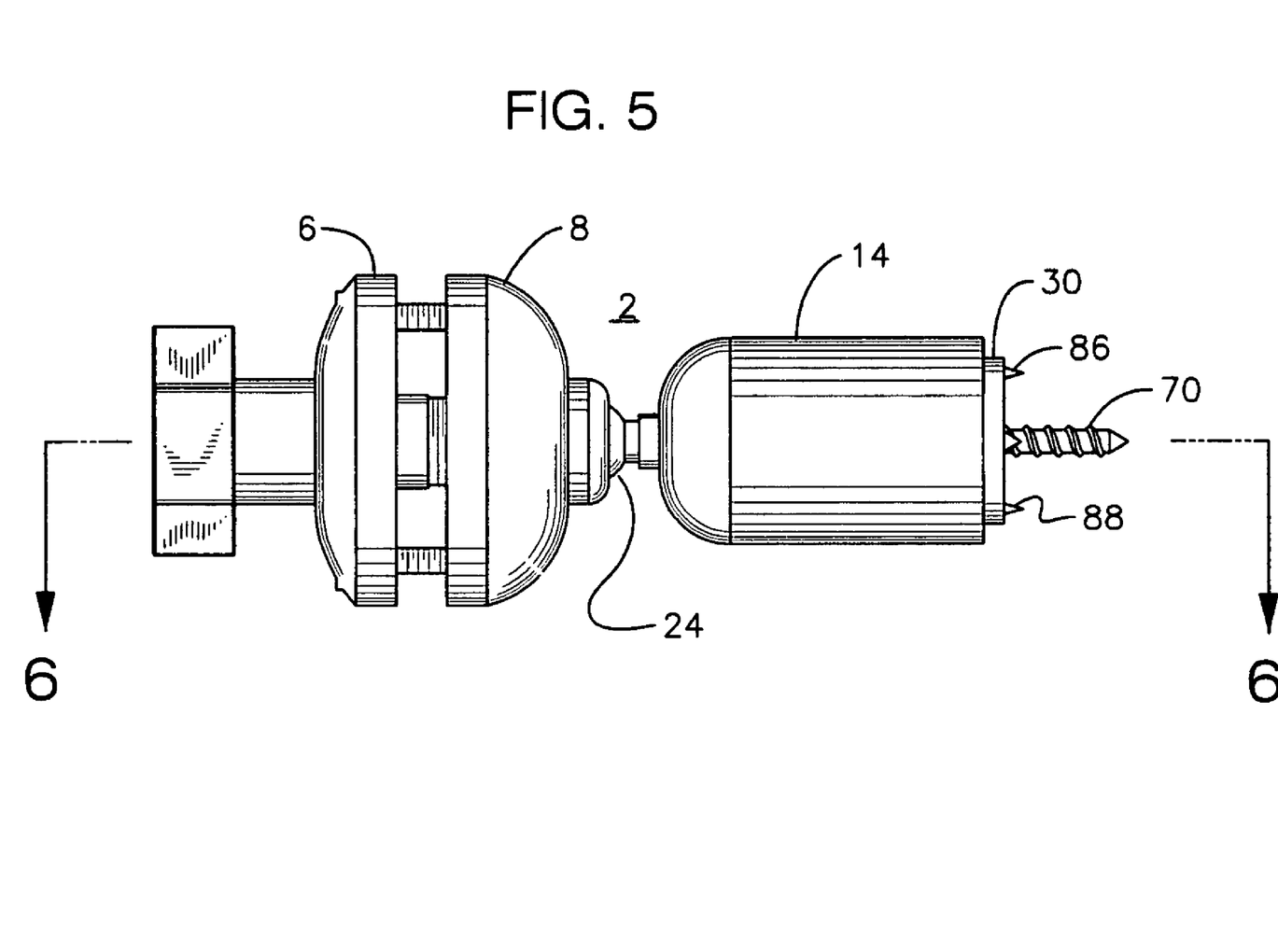
FIG. 5 is a front side view of the present invention.
Figure 6:
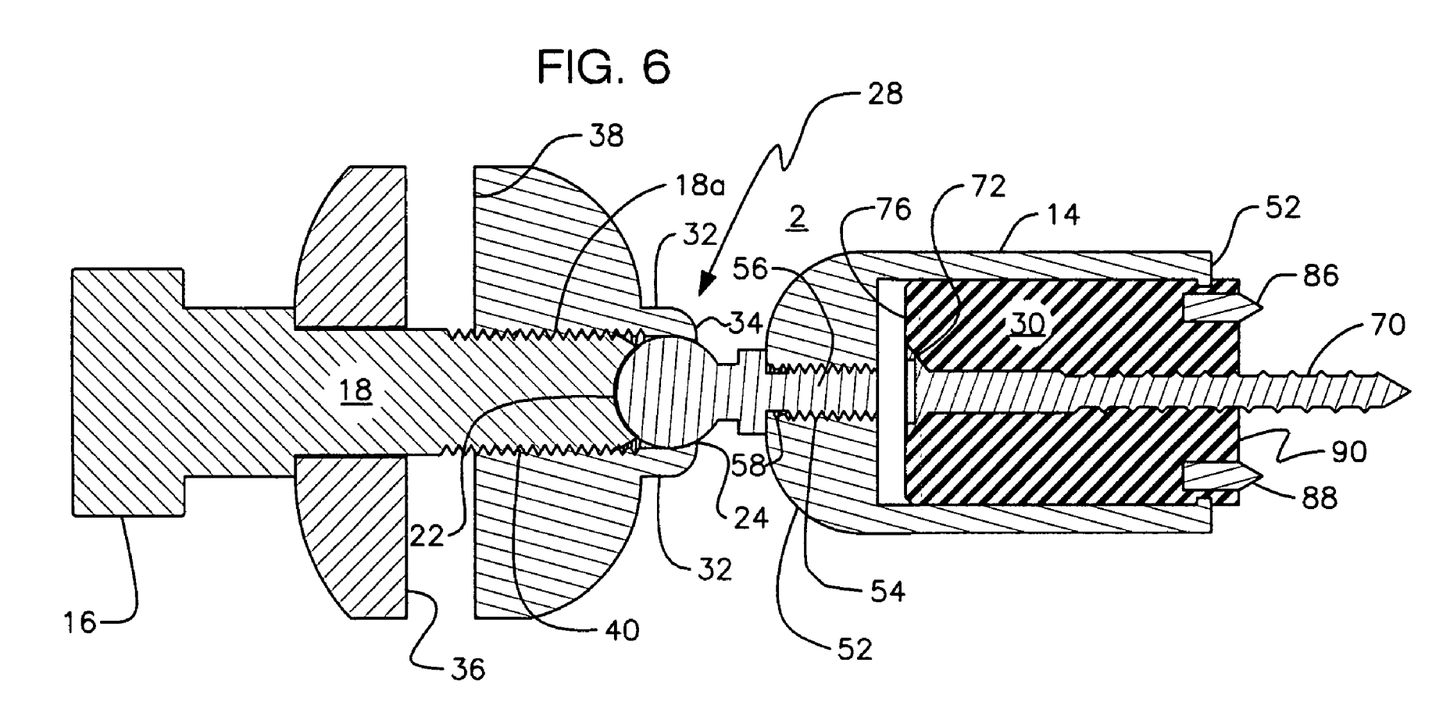
FIG. 6 a section view of FIG. 5.
Figure 7:
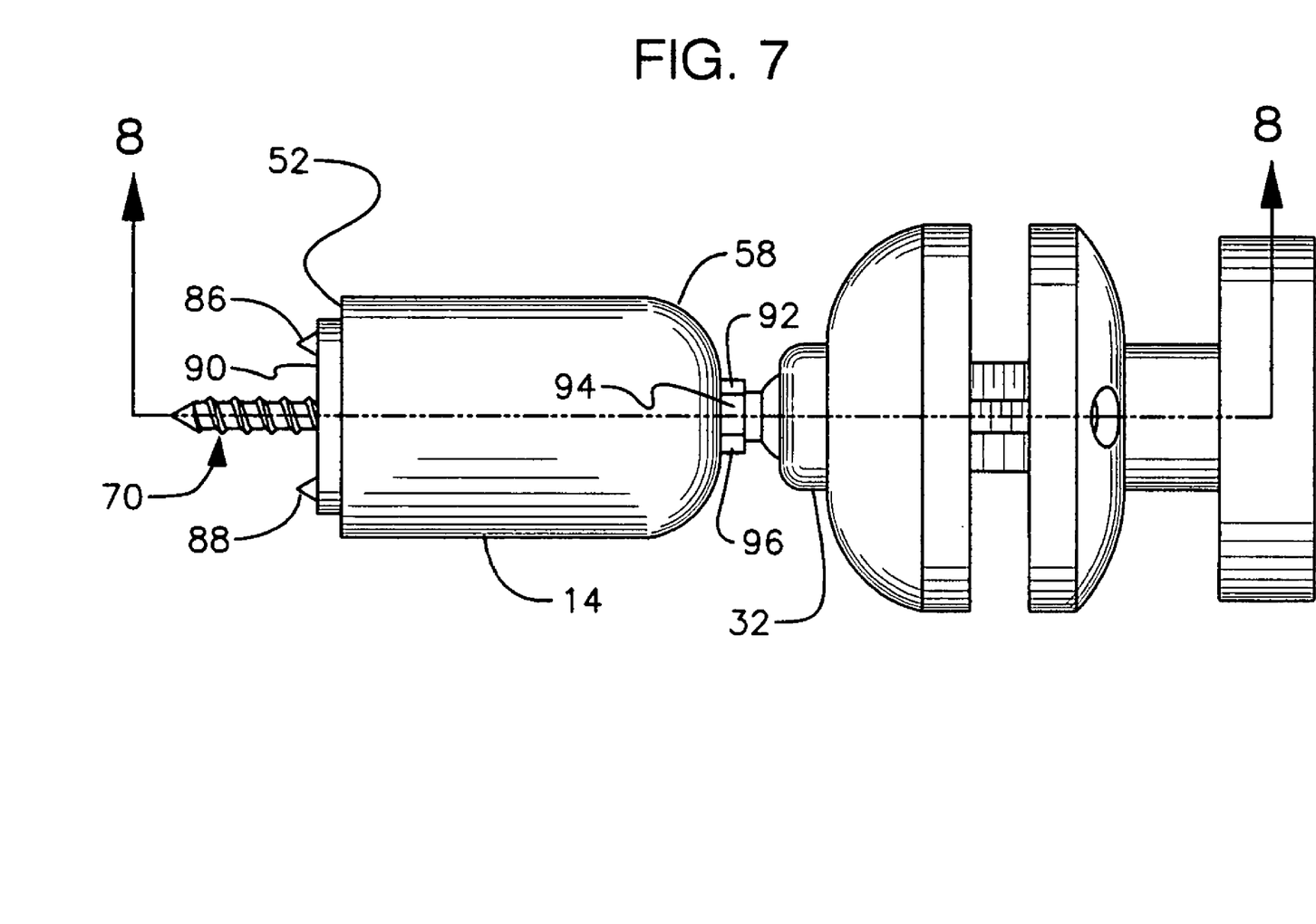
FIG. 7 is a rear view of the present invention.

Referring now in greater detail to the drawings, in which like numerals represent like components throughout the several view, FIG. 1 is a perspective view of the bird perch holder 2 which is the present invention. Mounting means 4 has a first side 6 and a second side 8 forcibly jointed together by two mounting bolts, a first mounting bolt is shown as mounting bolt 10a in FIG. 1 and a second mounting bolt 10b is shown in FIGS. 2, 4 and 7. First side 6 and second side 8 are adapted to receive there between the side of a cage 12 (FIG. 8) or a portion of a wall to which the bird perch holder 2 is to be joined.

Figure 8:
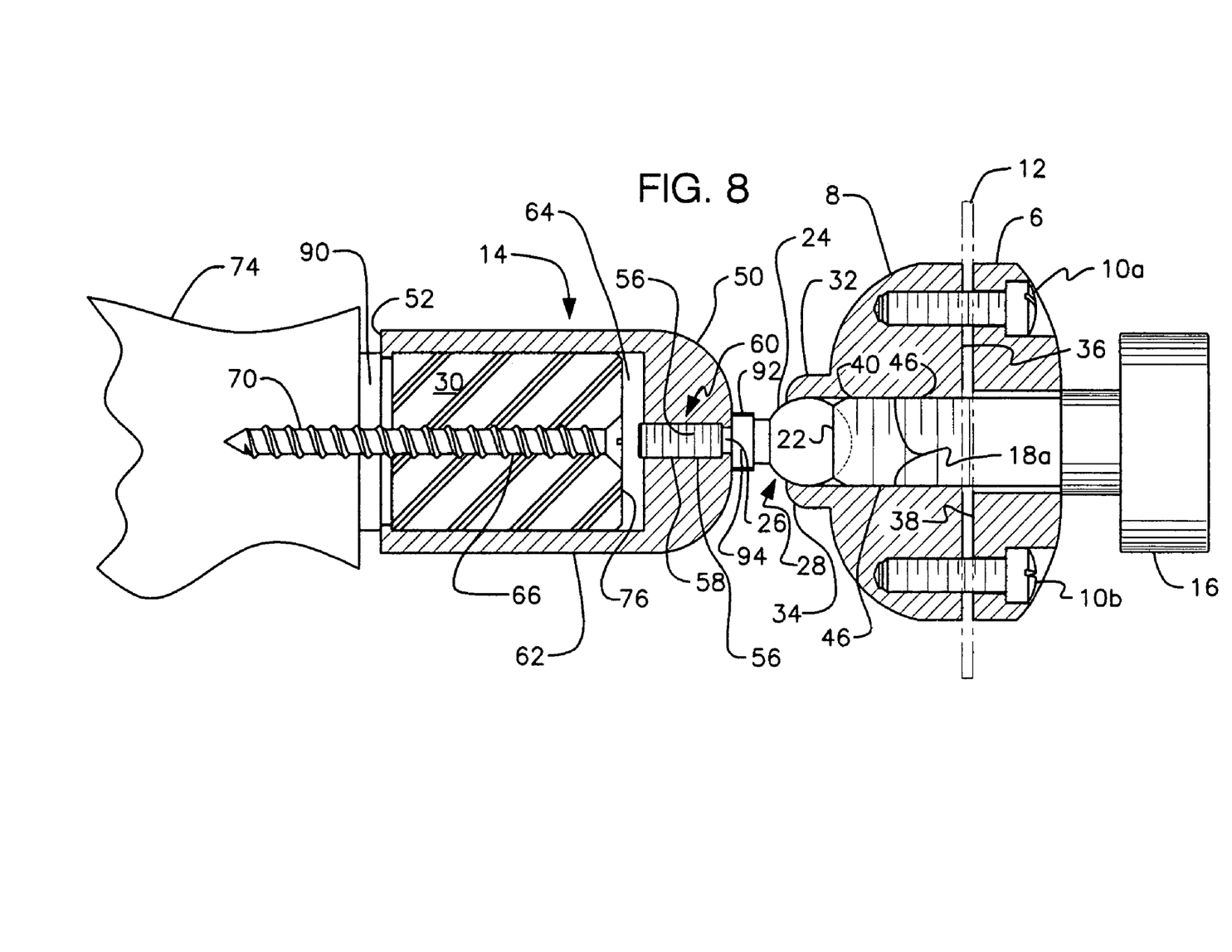
FIG. 8 is sectional view of FIG. 7.

In a typical use, the wires 12 comprising the structure of a bird cage (see FIG. 8) may be caused to be between said first side 6 and said second side 8. As bolt 10a and bolt 10b are secured to join first side 6 and second side 8 juxtaposed, bird perch holder 2 is positioned for further use in mounting bird perch 74. FIG. 8 shows a side view of the present invention with cage 12 positioned between first side 6 and second side 8.

Perch holding means 14 is mating secured to mounting means 4 as will be disclosed in greater detail herein after. As handle 16 is tightened, perch holding means 14 may be secured at various positions as determined by the user and as disclosed further in FIG. 10.

Referring now to FIG. 2, the present invention is disclosed with greater specificity in an exploded view. Handle 16 has an adjustment bolt 18 permanently affixed as a part thereof. Exposed end 20 of adjustment bolt 18 has a recessed spherical cut 22 at exposed end 20. Spherical cut 22 is conformed to mate with ball 24.

Figure 9:
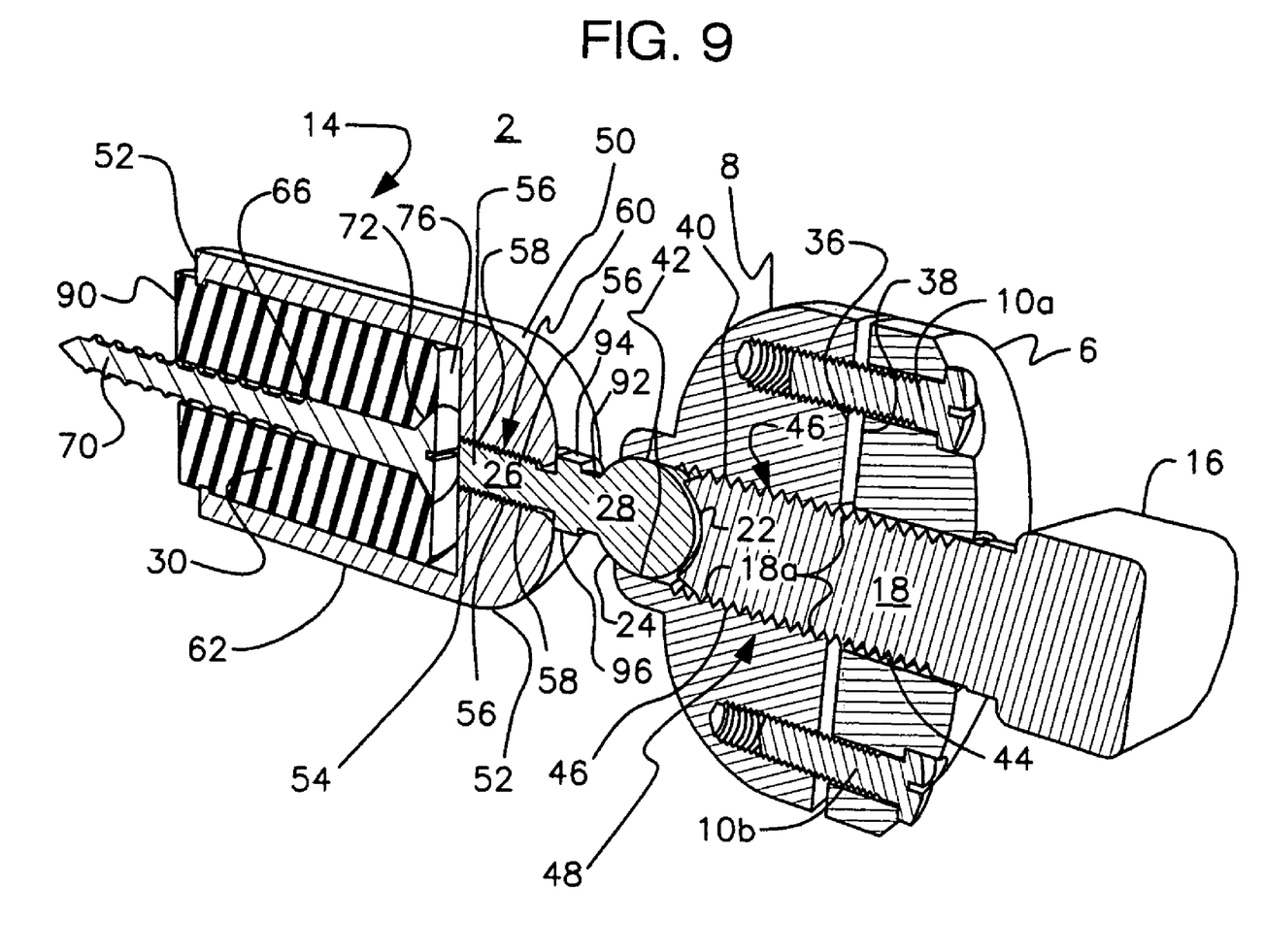
FIG. 9 is a perspective sectional view of the present invention.

Referring to FIG. 9, adjustment bolt 18 is of sufficient length to pass through first side 6 and matingly thread into side 8. As further appreciated from the disclosure hereinafter set forth, adjustment bolt 18 has male threads 18a about the periphery of adjustment bolt 18 which matingly conform and mate with the female threads 46 of linear bore 40 of side 8. As adjustment bolt 18 is screwed into linear bore 40 of side 8, spherical concave end 22 of adjustment bolt 18 forcibly and rotatably compresses ball 24 into spherical collar 32. As adjustment bolt 18 is tightened (screwed) into female threads 46 of linear bore 40 of second side 8, ball 24 is pressed into spherical collar 32 such that ball 24 is rigidly and securely positioned into spherical collar 32.

Ball 24 has a linear member 26 attached thereto or as an integral portion thereof and may be referred to as ball joint component 28. In a preferred embodiment, linear member 26 of ball joint component 28 is of sufficient length to mate with perch holding means 14. Ball joint component 28 may be formed from a unitary piece of material, preferably metal or may be two separate components jointed together. The materials of the present invention may also be formed of nylon, steel or aluminum or combinations thereof. It is desired that the components be of sufficient density to defray wear when exposed to the pecking or scratching activities of the bird for the present inventions's use. In a preferred embodiment, mounting means 14 is made from high density nylon for flexibility when mating with perch securing means 30. Ball joint component 28 is disclosed as having a linear member 26 which is threaded at the end opposite ball 24.

Referring to FIGS. 4 and 8, side 8 of mounting means 4 comprises a spherical collar 32 for adjustable mating with ball 24. Spherical collar 32 is dimensioned such that ball 24 will fit there into. Spherical collar 32 extends from second side 8 and has a diameter at outwardly extending end 34 which is has a dimension which is less than the diameter of ball 24. By this configuration ball 24 may be inserted into second side 8 yet not pass through side 8.

Second side 8 has a planar surface 36. First end 6 has a planar surface 38. Second side 8 has a linear bore 40 which extends from and through spherical collar 32 and through second end 8 and planar surface 36 of second side 8. Linear bore 40 has female threads 46 (FIGS. 8 and 9).

Linear bore 40 has a diameter 42 at the outwardly extending end 34 of spherical collar 32 which is less than the diameter of ball 24 to restrain ball 24 from passing through spherical collar 32.

Referring to FIG. 9, the particular configuration disclosed permits ball joint component 28 to be inserted from planar side 36 of second side 8, through linear bore 40 of side 8 and to rotably conform (seat) into spherical collar 32. Diameter 42 of ball 24 is less than diameter 48 of linear bore 40 to enable ball joint component 28 to be inserted into second side 8 from planar surface 36 of side 8 and to be seated in spherical collar 32.

As disclosed in cross sectional view of FIG. 9, adjustment bolt 18 of handle 16 enables the user of the present invention to cause the linear member of ball joint component 28 to be fixedly disposed at a predetermined angle with respect to planar surface 36 of side 8. Linear member 26 of boil joint component 28 may be permanently attached to perch holding means 14. In such an embodiment, linear member 26 of ball joint component 28 may be permanently secured to perch holding means 14.

In a preferred embodiment, ball joint component 28 has male threads about the periphery of linear member 26 of ball joint component 28 which matingly secure ball joint component 28 into a female threaded linear bore 60 at a first end of perch holding means 14.

Referring to FIGS. 8 and 9, perch holding means 14 is disclosed as having a first end 50 and a second end 52. Perch holding means 14 is disclosed as being a cylindrical sleeve or slender cup 62 which is open at second end 52 and closed at first end 50. First end 50 has a linear threaded bore 60 with female threads 58 disposed about the internal periphery of linear bore 60 for mating engagement with male threads 56 about the periphery of linear member 26 of ball joint component 28.

Referring to exploded view of the present invention disclosed in FIG. 4 and further disclosed in the cross sectional perspective view disclosed in FIG. 9 and cross sectional view disclosed in FIG. 8, perch securing means 30 is removably inserted to the interior chamber 64 of perch holding means 14. In a preferred embodiment of the present invention, the perch securing means 30 is slidable insertable into the interior chamber 64 and slidable removable from interior chamber 64 of perch holding means 14.

Referring primarily to the exploded view disclosed in FIG. 4, perch securing means 30 has a linear circular bore 66 along the linear axis 68 of perch securing means 30 through which a wood screw 70 may be inserted. (Linear axis 68 is actually the linear axis of the present invention.) Linear circular bore 66 has a countersunk portion 72 at first end of 76 of perch securing means 30 for receiving the head of wood screw 70. While a crown wood screw is disclosed in the preferred embodiment, a metal screw or any similar structure for securing perch securing means 30 to perch 74 may be utilized. Perch 74 may be of wood or any other material to form perch 74 which is thusly disposed for use by a bird for standing, walking or chewing or otherwise exercising. It is intended that perch 74 which not part of the present invention will have a hole drilled into the end thereof for receiving wood screw 70. A wood screw is disclosed since in most instances the perch is composed of wood.

FIGS. 4, 5, 6, and 7 disclose a perch alignment means comprising a first needle point alignment pin 86 and a second needle point alignment pin 88, each separately mounted into second end 90 of perch securing means 30. When perch 74 is positioned by screw 70 to forcibly contact second end 90 of perch securing means 30, first needle point alignment pin 86 and second needle point alignment pin 86 are compressed against and/or into perch 74 to positionally stabilize perch 74 to avoid rotation or movement of perch 74 relative to perch alignment means 30.

Figure 10:
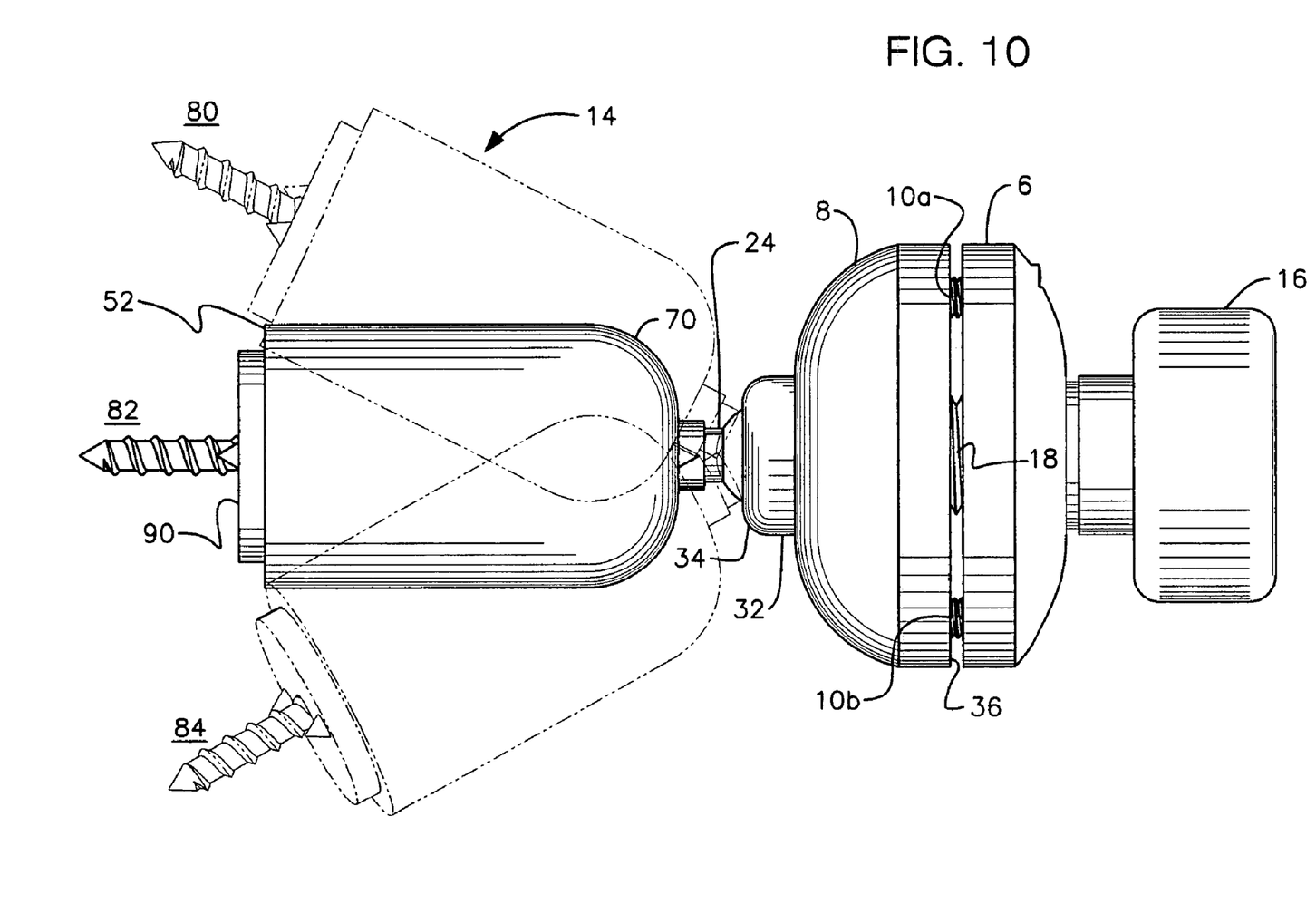
FIG. 10 is a side view of the present invention disclosing the means for securing the bird perch in a plurality of positions.

Referring to FIG. 10, it may be appreciated that perch securing means 14 may be selectively positioned into an array of positions 80, 82 or 84 as desired. Typically, a tree branch may be chosen for perch 74 (FIG. 8) and may be substantially straight or be of a varied configuration. Bird perch holder 2 may be used in combination with a second bird perch holder 2 secured to perch 74 at a second end thereof such that perch 74 is fixedly mounted to a bird cage at a first end of perch 74 and fixedly mounted to a bird cage at a second end of perch 74 to accommodate the weight of heavy birds as a stationary secure perch.

Referring now to FIG. 4, ball joint component 28 is further disclosed to have a collar 92 disposed around linear member 26 of ball joint component 28 between ball 24 and the male threaded portion 56 of linear member 26. As can be appreciated, collar 92 has a first flat portion 94 and a second flat portion 96 on the periphery of collar 92 to accommodate a securing apparatus, such as an open end wrench or pliers to cause ball joint component 28 to be securely mated into linear bore 60 of perch holding means 14 when collar 92 is tightened against end first end 50 of perch holding means 14.

Figure 11:
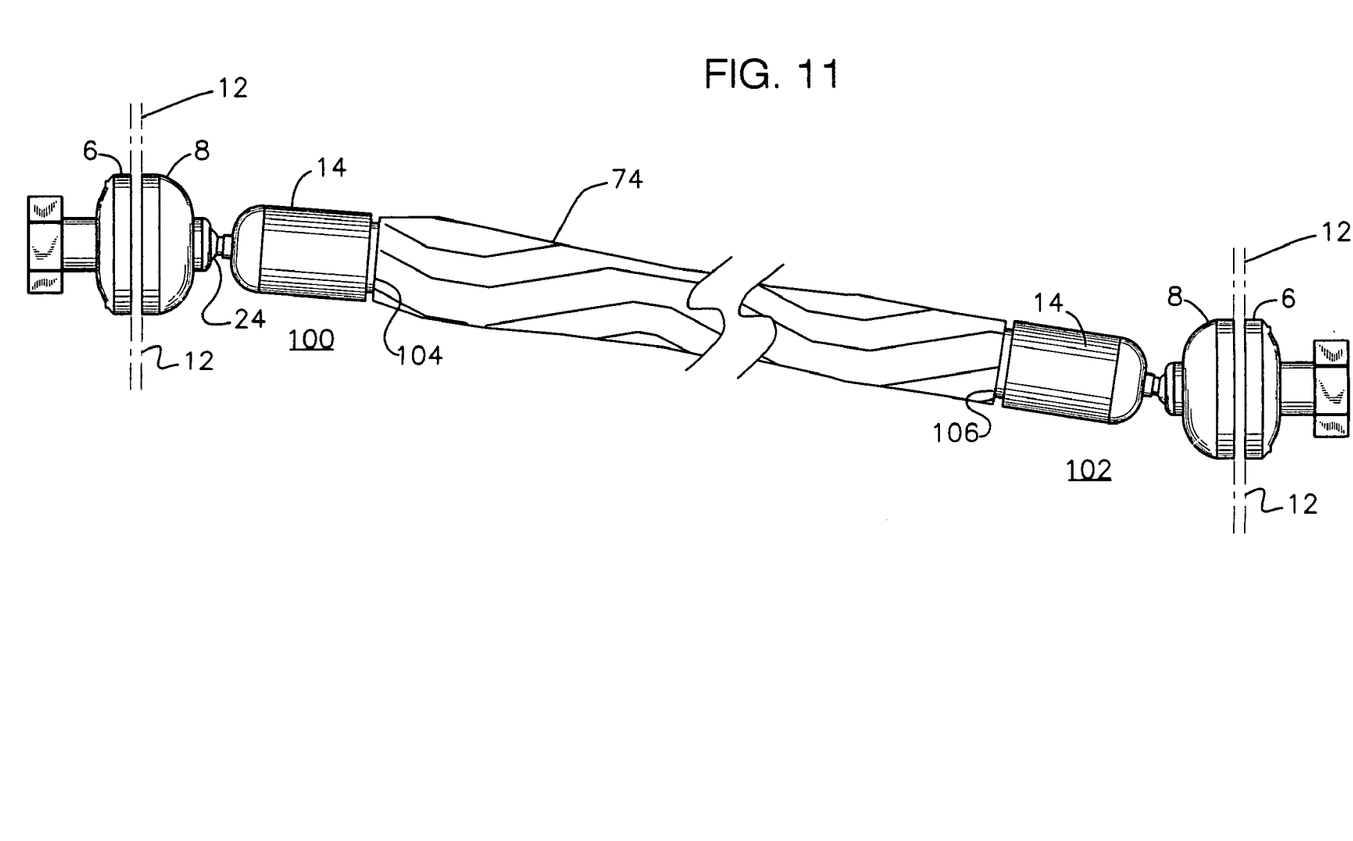
FIG. 11 is a side view showing two birch perch holders holding a bird perch.

In many applications of affixing bird perch 74 (FIG. 8) into an environment of a bird, it may be desirable to have both ends of a bird perch 74 secured to the housing structure for the bird. While some perches span from one side to the other side of a cage, the present invention may be utilized on both ends of perch 74 to thus secure both ends of a bird perch at accommodating angles. FIG. 11 discloses a first bird holder 100 secured to a first end 104 of bird perch 74 and a second bird perch holder 102 secured to a second end 106 of bird perch 74.

While the above description contains many specifics, these should not be construed as limitations on the scope of the intention, but rather as exemplifications of one or another preferred embodiments thereof. Many other variations are possible, which would be obvious to one skilled in the art. Accordingly, the scope of the invention should be determined by the scope of the appended claims and their equivalents, and not just by the embodiments.

It is, therefore, understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A bird perch holder comprising:
    a perch mounting means for securing said bird perch holder in a bird cage,
    an adjustment bolt having a recessed spherical end;
    a perch holding means comprising:
        a first end,
        a second end and
        a ball joint component,
            said ball joint component comprising:
                a ball portion having a periphery and
                a linear member mounted at a position on said periphery of said ball portion of said ball joint component;
    wherein said ball portion of said ball joint component mates with said perch mounting means; and
    wherein said adjustment bolt forcibly mates said ball joint component to rigidly position said perch holding means in a predetermined position relative to said perch mounting means.

2. A bird perch holder as set forth in claim 1 wherein said perch mounting means for securing said bird perch holder in a bird cage comprises:
- a first side having a planar surface and a bolt hole passing through said first side perpendicular to said planar surface;
- a second side having planar surface and a threaded bolt hole therein which is perpendicular to said planar surface;
- an adjustment bolt; and
- means for matingly engaging said first side juxtaposed said second side,
- wherein said means for engaging said first side juxtaposed said second side comprises at least one bolt which passes through said first side and screwingly engages said second side to cause said planar surface of said first side and said planar surface of said second side to be juxtaposed to mountingly engage a wire of a bird cage between said planar surface of said first side and said planar surface of said second side.

3. A bird perch holder as set forth in claim 1 wherein said perch mounting means for securing said bird perch holder in a bird cage comprises:
- a first side having a planar surface and a linear bore through said first side perpendicular to said planar surface;
- a second side having a planar surface, an outwardly extending surface, and a threaded linear bore there through which is perpendicular to said planar surface, said outwardly extending surface further comprising a spherical collar in alignment with said linear bore;
- an adjustment bolt having a first end and a second end, said adjustment bolt further comprising a handle at said first end and a threaded portion at said second end, said threaded portion screwingly engaging said threaded linear bore of said second side, said adjustment bolt further comprising a spherical concave end at said second end.

4. A bird perch holder as set forth in claim 3 to further comprise a ball joint component wherein said ball joint component is positioned inside said linear bore of said second side and nestingly engaged into said spherical collar of said second side, wherein said ball portion of said ball joint component mates with said spherical collar and said linear member of said ball joint component extends through said spherical collar to matingly engage said perch holding means; and
- wherein said spherical end of said adjustment bolt forcibly mates said ball portion of said ball joint component with said spherical collar to rigidly position said perch holding means in a predetermined position relative to said perch mounting means.

5. A bird perch holder as set forth in claim 4 to further comprise a perch holding means, said perch holding means comprising:
- a sleeve having a first end and a second end and a longitudinal axis from said first end to said second end, said first end being closed and said second end being open; and
- a perch securing means,
said sleeve comprising a threaded bore into said first closed end of said perch holding means, said threaded bore having a longitudinal axis in alignment with said longitudinal axis of said sleeve.

6. A bird perch holder as set forth in claim 5 to further comprise a perch securing means, said perch securing means comprising:
- a means for securing a bird perch thereto and wherein said perch securing means being dimensioned to slidingly mate into said second open end of said sleeve whereby the bird perch is secured to said perch holding means.

7. A bird perch holder as set forth in claim 6 wherein said sleeve comprises a threaded bore into said first closed end of said perch holding means, said threaded bore having a longitudinal axis in alignment with said longitudinal axis of said sleeve and wherein said linear member mounted at a position on said periphery of said ball portion of said ball joint component matingly engages said perch holding means wherein said spherical end of said adjustment bolt forcibly mates said ball portion of said ball joint component with said spherical collar to rigidly position said perch holding means in a predetermined position relative to said perch mounting means.

8. A bird perch holder as set forth in claim 7 wherein said perch securing means comprises a first end and a second end having a first indenture there into and further comprising perch alignment means secured to said second end of said perch securing means, said perch securing means comprising a needle point alignment pin fixedly positioned in said first indenture in said second end of said perch securing means whereby a perch affixed to said perch securing means is positionally stabilized.

9. A bird perch holder comprising:
- a perch mounting means for securing said bird perch holder in a bird cage wherein said perch mounting means comprises:
  - a first side and
  - a second side having a first end and a second end,
    - said second side having
      - a linear bore extending through said first end and through said second end;
    - said second side having
      - a spherical collar at the second end of said second side and aligned with said linear bore;
- an adjustment bolt having a recessed spherical end;
- a perch holding means comprising
  - a first end,
  - a second end and
  - a ball joint component,
    - said ball joint component comprising:
      - a ball portion having a periphery and
      - a linear member mounted at a position on said periphery of said ball portion of said ball joint component;
    - said ball joint component being positioned inside said linear bore
- wherein said ball portion of said ball joint component mates with said spherical collar and said linear member of said ball joint component extends through said spherical collar to matingly engage said perch holding means; and
- wherein said spherical end of said adjustment bolt forcibly mates said ball joint with said spherical collar to rigidly position said perch holding means in a predetermined position relative to said perch mounting means.

10. A bird perch holder comprising:
a perch mounting means for securing said bird perch holder in a bird cage wherein said perch mounting means comprises:
a first side and
a second side having a first end and a second end,
said second side having
a linear bore extending through said first end and through said second end;
said second side having
a spherical collar at the second end of said second side and aligned with said linear bore;
an adjustment bolt having a recessed spherical end;
a perch holding means comprising
a first end,
a second end and
a ball joint component,
said ball joint component comprising:
a ball portion having a periphery and
a linear member mounted at a position on said periphery of said ball portion of said ball joint component;
said ball joint component being positioned inside said linear bore,
wherein said ball portion of said ball joint component mates with said spherical collar and said linear member of said ball joint component extends through said spherical collar to matingly engage said perch holding means; and
wherein said spherical end of said adjustment bolt forcibly mates said ball joint with said spherical collar to rigidly position said perch holding means in a predetermined position relative to said perch mounting means in combination with a second bird perch holder comprising:
a perch mounting means for securing said bird perch holder in a bird cage,
an adjustment bolt having a recessed spherical end;
a perch holding means comprising:
a first end,
a second end and
a ball joint component,
said ball joint component comprising:
a ball portion having a periphery and
a linear member mounted at a position on said periphery of said ball portion of said ball joint component;
wherein said ball portion of said ball joint component mates with said perch holding means; and
wherein said adjustment bolt forcibly mates said ball joint component to rigidly position said perch holding means in a predetermined position relative to said perch mounting means, and
wherein said first bird perch holder is attached to a first end of a bird perch and wherein said second bird perch holder is attached to a second end of a bird perch.

* * * * *